US007557834B2

(12) United States Patent
Kaneko et al.

(10) Patent No.: US 7,557,834 B2
(45) Date of Patent: Jul. 7, 2009

(54) IMAGE PICKUP APPARATUS AND SYNCHRONIZATION SIGNAL GENERATING APPARATUS

(75) Inventors: Katsumi Kaneko, Kanagawa (JP); Takashi Tsuchiya, Tokyo (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 10/528,401

(22) PCT Filed: Jul. 16, 2004

(86) PCT No.: PCT/JP2004/010527

§ 371 (c)(1),
(2), (4) Date: Mar. 17, 2005

(87) PCT Pub. No.: WO2005/009031

PCT Pub. Date: Jan. 27, 2005

(65) Prior Publication Data
US 2006/0013507 A1    Jan. 19, 2006

(30) Foreign Application Priority Data
Jul. 18, 2003    (JP)    ............................... 2003-276801

(51) Int. Cl.
H04N 5/228    (2006.01)
(52) U.S. Cl. ................... 348/222.1; 348/439.1
(58) Field of Classification Search .............. 348/207.1, 348/473, 474, 434.1, 459, 454, 439.1, 207.11, 348/439, 222.1, 220.1, 42, 312, 47, 434; 386/131, 129, 68, 110
See application file for complete search history.

(56) References Cited

U.S. PATENT DOCUMENTS

| 5,739,894 | A | * | 4/1998 | Weisgerber | ................... 352/46 |
| 5,815,211 | A | | 9/1998 | Umei | |
| 2002/0021364 | A1 | * | 2/2002 | Asada et al. | ................. 348/312 |
| 2004/0081437 | A1 | | 4/2004 | Asada et al. | |
| 2004/0151479 | A1 | | 8/2004 | Ogikubo | |

FOREIGN PATENT DOCUMENTS

EP    1 420 579    5/2004
JP    11-177930    7/1999

(Continued)

Primary Examiner—Lin Ye
Assistant Examiner—Nelson D. Hernández Hernández
(74) Attorney, Agent, or Firm—Frommer Lawrence & Haug LLP; William S. Frommer

(57) ABSTRACT

An image signal generation portion 11 generates an image signal of a variable frame-rate picked-up image. A signal generation control portion 24 drives the image signal generation portion 11 and generates image pick-up setting information IF to generate an image signal that is frame-synchronized with a generated image signal DVd. The generated image signal DVd is output in condition where the image pick-up setting information IF is inserted in it. When supplied with image pick-up setting information IFex, the signal generation control portion 24 controls the driving operations of the image signal generation portion 11 based on the image pick-up setting information IFex, to frame-synchronize the generated image signal with an image signal of a reference variable frame-rate picked-up image of a source that has supplied the image pick-up setting information IFex. If a plurality of image pick-up devices capable of varying a frame rate is used, the image signals can be frame-synchronized with each other.

9 Claims, 12 Drawing Sheets

FOREIGN PATENT DOCUMENTS

| | | |
|---|---|---|
| JP | 2002-152569 | 5/2002 |
| JP | 2002-320203 | 10/2002 |
| JP | 2004-7543 | 1/2004 |
| JP | 2004-180289 | 6/2004 |
| WO | WO 02/39737 | 5/2002 |
| WO | WO 03/085969 | 10/2003 |

* cited by examiner

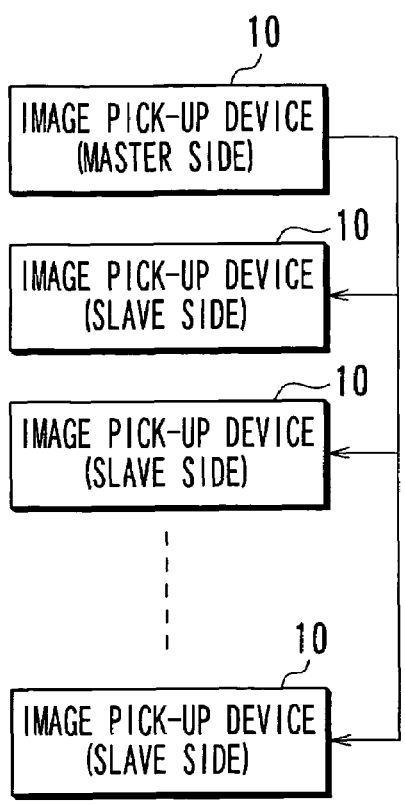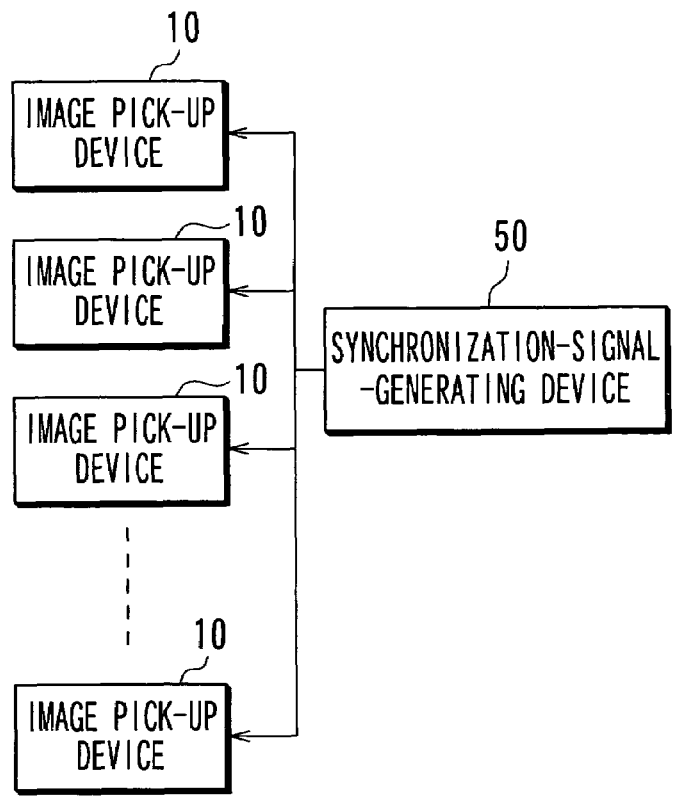
F I G. 1 A          F I G. 1 B

F I G. 3

| VARIABLE FRAME RATE, FRc | NUMBER OF ADDED FRAMES, FA | IMAGE PICK-UP FRAME RATE, FRp=FRc×FA |
|---|---|---|
| 60P≧FRc>30P | 1 | 60P≧FRp>30P |
| 30P≧FRc>20P | 2 | 60P≧FRp>40P |
| 20P≧FRc>15P | 3 | 60P≧FRp>45P |
| 15P≧FRc>12P | 4 | 60P≧FRp>48P |
| 12P≧FRc>10P | 5 | 60P≧FRp>50P |
| 10P≧FRc>6P | 6 | 60P≧FRp>36P |
| 6P≧FRc>5P | 10 | 60P≧FRp>50P |
| 5P≧FRc>4P | 12 | 60P≧FRp>48P |
| 4P≧FRc>3P | 15 | 60P≧FRp>45P |
| 3P≧FRc>2P | 20 | 60P≧FRp>40P |
| 2P≧FRc>1P | 30 | 60P≧FRp>30P |
| 1P | 60 | 60P |

| | | | | |
|---|---|---|---|---|
| FIG. 6A (Hct) | 0 \| 1 \| ... \| 2439 \| 1 | | | |
| FIG. 6B (Vct) | 0 \| 1 \| ... \| 1124 \| 1 | | | |
| FIG. 6C (Fpct) | 0 \| 1 \| 2 \| 3 \| 4 \| 5 \| 6 \| 7 \| 8 \| 9 \| ... \| 48 \| 49 \| 50 \| 51 \| 52 \| 53 \| 0 \| 1 \| 2 | | | |
| FIG. 6D (Fmct) | 0 \| 1 \| 2 \| 0 \| 1 \| 2 \| 0 \| 1 \| 2 \| 0 \| ... \| 0 \| 1 \| 2 \| 0 \| 1 \| 2 | | | |
| FIG. 6E (Rct) | 0 \| 1 \| 2 \| ... \| 16 \| 17 \| 0 | | | |

FIG. 7A (DVb)
FIG. 7B (RAM-1)
FIG. 7C (RAM-2)
FIG. 7D (RAM-3)
FIG. 7E (DVc)
FIG. 7F (DJ)

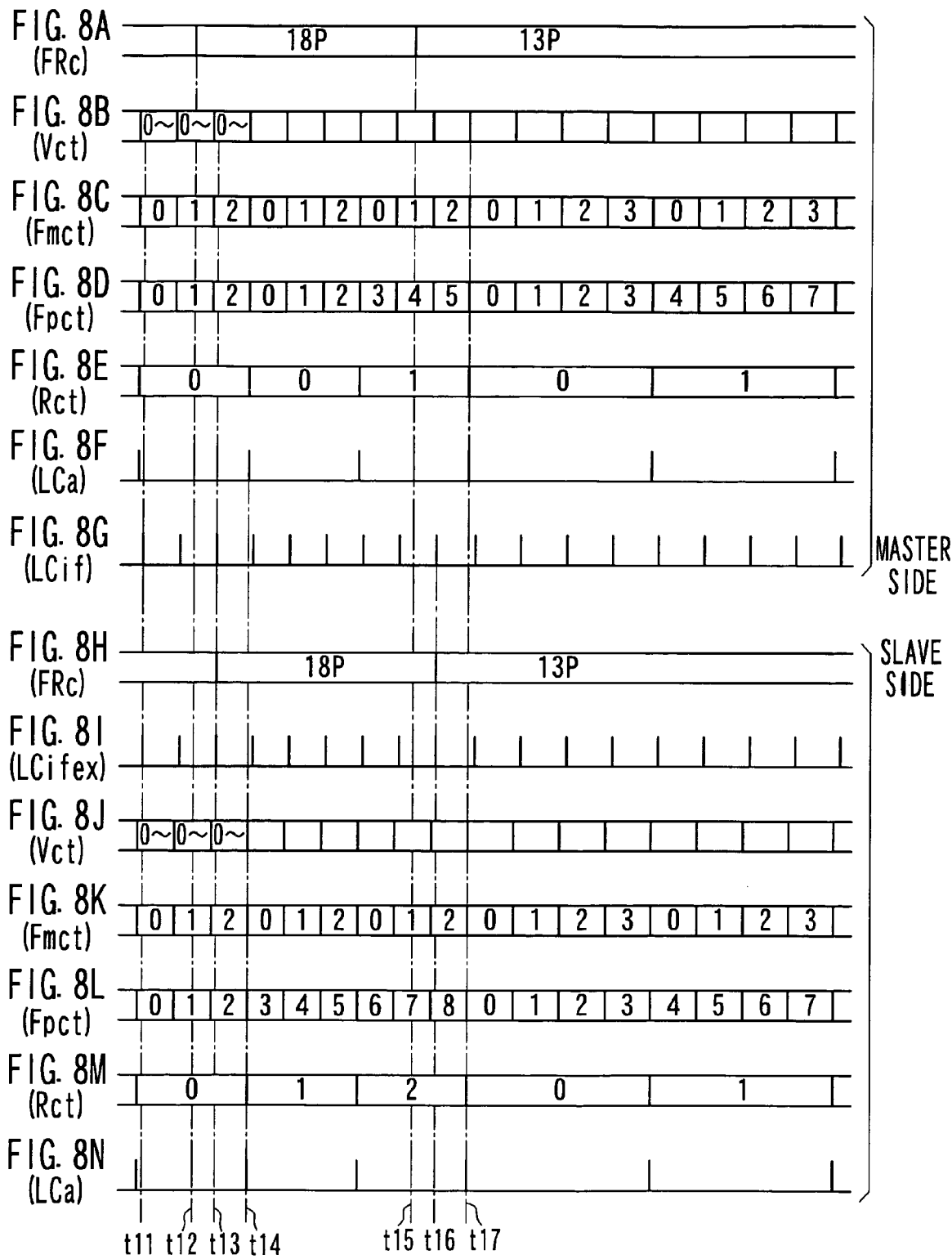

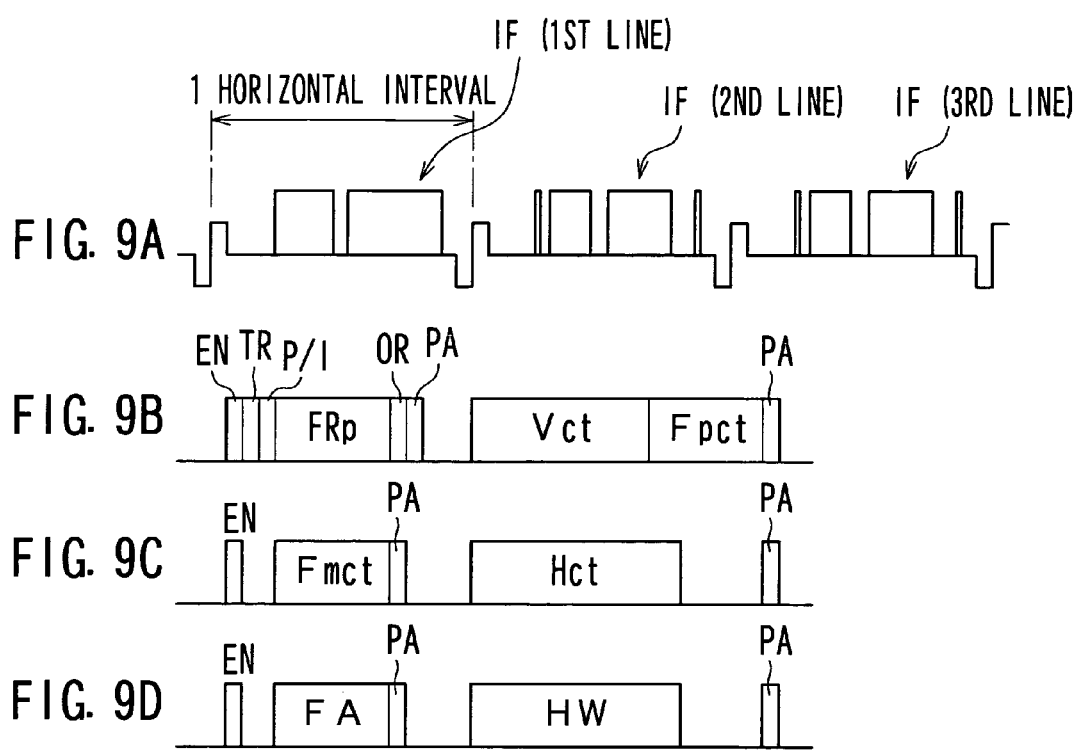

FIG. 10

| VARIABLE FRAME RATE, FRc | IMAGE PICK-UP FRAME RATE, FRp | COUNT WIDTH OF H COUNTER |
|---|---|---|
| 60P | 60P | 2200 |
| 59P | 59P | 2240 |
| 58P | 58P | 2272 |
| ⋮ | ⋮ | ⋮ |
| 19P | 57P | 2312 |
| 18P | 54P | 2440 |
| 17P | 51P | 2584 |
| ⋮ | ⋮ | ⋮ |
| 14P | 56P | 2360 |
| 13P | 52P | 2536 |
| 12P | 48P | 2752 |
| ⋮ | ⋮ | ⋮ |
| 2P | 60P | 2200 |
| 1P | 60P | 2200 |

IMAGE PICKUP APPARATUS AND SYNCHRONIZATION SIGNAL GENERATING APPARATUS

TECHNICAL FIELD

The present invention relates to an image pick-up device and a synchronization-signal-generating device. More specifically, it relates to supplying an image pick-up device with image pick-up setting information from any other image pick-up device or a synchronization-signal-generating device, to drive image signal generation means which generates an image signal of a picked-up image with variable frame rate based on this image pick-up setting information, thereby causing the image signal generation means to generate a frame-synchronized image signal even if a frame rate of the picked-up image with variable frame rate is varied.

BACKGROUND ART

In conventional filmmaking etc., to obtain special video effects, scenes have been shot in condition where a shooting speed of a film camera, that is, the number of frames per second has been varied. For example, if a scene is shot at a higher speed than an ordinary one and reproduced at the ordinary speed, reproduced images are slowly seen. Therefore, fast motion of, for example, a water droplet falling into water can be observed easily and in detail. If a scene is shot at a lower speed than the ordinary one and reproduced at the ordinary speed, on the other hand, reproduced images can be fast seen. It is thus possible to enhance a sense of speed in a fight scene, a car chase scene, etc., thereby presenting images with an enhanced sense of reality.

Further, in TV program making etc., while an attempt has been made to digitize processing of shooting, editing, delivery, etc. of a program, an attempt has also been made to digitize processing in filmmaking etc. as fueled by an increase in image quality and a decrease in costs caused by progress in digital technologies.

It is noted that if images are to be picked up using an image pick-up device (video camera) due to digitization of TV program, filmmaking, etc., an image pick-up device described in Jpn. Pat. Appln. KOKAI Publication No. 2000-125210 and supposed to be capable of frame rate varying is used so that special video effects such as fast reproduction and slow reproduction can be obtained easily. By using this image pick-up device to pick up images at a lower speed than a predetermined frame rate and reproduce them at the predetermined frame rate, fast motion of the reproduced images can be obtained easily. By picking up the images at a higher frame rate and reproducing them at the predetermined frame rate, on the other hand, slow motion of the reproduced images can be obtained easily.

In a case where a plurality of image pick-up devices each capable of varying a frame rate thereof is used to pick up images of a target in different directions, by synchronizing the frames of image signals obtained by these image pick-up devices with each other, it is possible to obtain a fast motion reproduction image or a slow motion reproduction image that has the same speed and has been picked up in the plurality of directions. For example, if the target is shot at a higher frame rate and reproduced at a predetermined frame rate, it is possible to obtain a slow motion reproduction image picked up in different directions in which the target moves at the same speed. Therefore, by synchronizing the frames of the image signals obtained by the image pick-up devices with each other, it is possible to facilitate subsequent editing processing.

However, if the frame rates of the image pick-up devices are varied during image pick-up, it is almost impossible to synchronize the frames of the image pick-up devices through user operations.

DISCLOSURE OF THE INVENTION

An image pick-up device according to the invention comprises image signal generation means for generating an image signal of a variable frame-rate picked-up image, drive-and-control means for driving and controlling the image signal generation means, setting information generation means for generating image pick-up setting information to generate an image signal which is frame-synchronized with the image signal generated by the image signal generation means, and output means for outputting the image signal generated by the image signal generation means and the image pick-up setting information.

Another image pick-up device related to the present invention comprises image signal generation means for generating an image signal of a variable frame-rate picked-up image, and drive-and-control means for receiving image pick-up setting information to generate an image signal that is frame-synchronized with the image signal of a reference variable frame-rate picked-up image, and controlling a driving operation of the image signal generation means based on this image pick-up setting information, thereby frame-synchronizing the image signal generated by the image signal generation means with the image signal of the reference variable frame-rate picked-up image.

Further, a synchronization-signal-generating device according to the invention supplies a synchronization signal to an image pick-up device having image signal generation means for generating an image signal of a variable frame-rate picked-up image, the device comprising setting information generation means for generating image pick-up setting information which is used to frame-synchronize the image signal generated by the image signal generation means of the image pick-up device with a reference frame, synchronization signal generation means for generating the synchronization signal that corresponds to the reference frame, synchronization signal output means for outputting the generated synchronization signal with the generated image pick-up setting information being inserted there into, and control means for setting the reference frame.

In the present invention, the drive-and-control means drives and controls the image signal generation means that generates an image signal of a variable frame-rate picked-up image. Further, the setting information generation means generates image pick-up information for generating an image signal, which is frame-synchronized with this generated image signal. The generated image signal is output from the output means with this image pick-up setting information being inserted into, for example, a blanking interval of the generated image signal. Further, if the image pick-up setting information includes frame rate information, a frame rate indicated by the frame rate information contained in the image pick-up setting information is set as a frame rate of the variable frame-rate picked-up image, starting from its frame that is given first after this image pick-up setting information is output, thereby generating the image signal. Further, when a frame rate is instructed according to a read frame rate alteration pattern to vary the frame rate of a variable frame-rate picked-up image, information indicating the read frame rate alteration pattern is contained in the image pick-up setting information and also the instructed frame rate is set as the frame rate of the variable frame-rate picked-up image, starting from its frame that is given first after the image pick-up setting information is output, thus generating the image signal. Furthermore, if a plurality of frame rate instruction means is equipped for instructing a frame rate of a variable frame-rate picked-up image, priority sequence is set to the plurality of frame rate instruction means, so that when more than one frame rate instruction is carried out, frame rate instructed by the frame rate instruction means having the highest priority is set as the frame rate of the variable frame-rate picked-up image.

When the image pick-up setting information is input, based on this image pick-up setting information, the driving operation of image signal generation means is controlled so that the generated image signal can be frame-synchronized with an image signal of the reference variable frame-rate picked-up image. If this image pick-up setting information contains frame rate information that indicates a frame rate of the reference variable frame-rate picked-up image, a frame rate indicated by the frame rate information contained in the input image pick-up setting information is set as a frame rate of the variable frame-rate picked-up image, starting from its frame which is given first after the image pick-up setting information is input, thus generating the image signal. Further, if the image pick-up setting information includes information for reading a frame rate alteration pattern, a frame rate instructed on the basis of the frame rate alteration pattern is set as the frame rate of the variable frame-rate picked-up image, starting from its frame which is given first after the image pick-up setting information is input, thus generating the image signal. Furthermore, if priority sequence is set to a frame rate instructed by the frame rate instruction means and a frame rate based on the image pick-up setting information and when more than one frame rate instruction is carried out, a frame rate instructed by the frame rate instruction means having the highest priority is set as the frame rate of the variable frame-rate picked-up image, thus generating the image signal.

Further, in the synchronization-signal-generating device, image pick-up setting information is generated for frame-synchronizing the image signal generated by the image pick-up device with the reference frame and a synchronization signal corresponding to the reference frame is generated, so that the generated synchronization signal is output with the image pick-up setting information being inserted into, for example, a blanking interval of the synchronization signal.

BRIEF DESCRIPTION OF THE DRAWINGS

FIG. 1A is a diagram for showing a configuration of an image pick-up system;

FIG. 1B is a diagram for showing a configuration of another image pick-up system;

FIG. 3 is a diagram for showing a relationship of an image pick-up frame rate and the number of add frames with respect to a variable frame rate;

FIG. 6A is a diagram for showing one example of a count value of a counter;

FIG. 6B is a diagram for showing another example of the count value of a counter;

FIG. 6C is a diagram for showing further example of the count value of a counter;

FIG. 6D is a diagram for showing still further example of the count value of a counter;

FIG. 6E is a diagram for showing additional example of the count value of each counter;

FIG. 7A is a diagram for explaining an operation of generating an image signal in a picked-up image with variable frame-rate;

FIG. 7B is a diagram for explaining the operation of generating the image signal in the picked-up image with variable frame-rate;

FIG. 7C is a diagram for explaining the operation of generating the image signal in the picked-up image with variable frame-rate;

FIG. 7D is a diagram for explaining the operation of generating the image signal in the picked-up image with variable frame-rate;

FIG. 7E is a diagram for explaining the operation of generating the image signal in the picked-up image with variable frame-rate;

FIG. 7F is a diagram for explaining the operation of generating the image signal in the picked-up image with variable frame-rate;

FIG. 8A is a diagram for showing operations of the image pick-up devices of a master side and a slave side;

FIG. 8B is a diagram for showing the operations of the image pick-up devices of the master side and the slave side;

FIG. 8C is a diagram for showing the operations of the image pick-up devices of the master side and the slave side;

FIG. 8D is a diagram for showing the operations of the image pick-up devices of the master side and the slave side;

FIG. 8E is a diagram for showing the operations of the image pick-up devices of the master side and the slave side;

FIG. 8F is a diagram for showing the operations of the image pick-up devices of the master side and the slave side;

FIG. 8G is a diagram for showing the operations of the image pick-up devices of a master side and a slave side;

FIG. 8H is a diagram for showing the operations of the image pick-up devices of the master side and the slave side;

FIG. 8I is a diagram for showing the operations of the image pick-up devices of the master side and the slave side;

FIG. 8J is a diagram for showing the operations of the image pick-up devices of the master side and the slave side;

FIG. 8K is a diagram for showing the operations of the image pick-up devices of the master side and the slave side;

FIG. 8L is a diagram for showing the operations of the image pick-up devices of the master side and the slave side;

FIG. 8M is a diagram for showing the operations of the image pick-up devices of the master side and the slave side;

FIG. 8N is a diagram for showing the operations of the image pick-up devices of the master side and the slave side;

FIG. 9A is a diagram for showing image pick-up setting information;

FIG. 9B is a diagram for showing the image pick-up setting information;

FIG. 9C is a diagram for showing the image pick-up setting information;

FIG. 9D is a diagram for showing the image pick-up setting information;

FIG. 10 is a diagram for showing a count width of an H counter;

BEST MODE FOR CARRYING OUT THE INVENTION

The following will describe one embodiment of the present invention with reference to drawings. FIGS. 1A and 1B each shows a configuration of an image pick-up system that can use a plurality of image pick-up devices each capable of varying a frame rate thereof, to frame-synchronize image signals generated by these image pick-up devices with each other, FIG. 1A of which shows a case where the system is constituted of a plurality of image pick-up devices 10 only and FIG. 1B of which shows a case where it is constituted of a synchronization-signal-generating device 50 and the plurality of image pick-up devices 10.

If no synchronization-signal-generating device 50 is used, the image pick-up devices 10 are connected as shown in FIG. 1A, one of which is set as a master side image pick-up device so that image signals generated by the slave-side image pick-up devices may be frame-synchronized with an image signal generated by this master-side image pick-up device. If the synchronization-signal-generating device 50 is used, on the other hand, the image pick-up devices 10 are connected to the synchronization-signal-generating device 50 as shown in FIG. 1B, so that this synchronization-signal-generating device 50 may frame-synchronize the image signals generated by the image pick-up devices 10.

Figure 2:
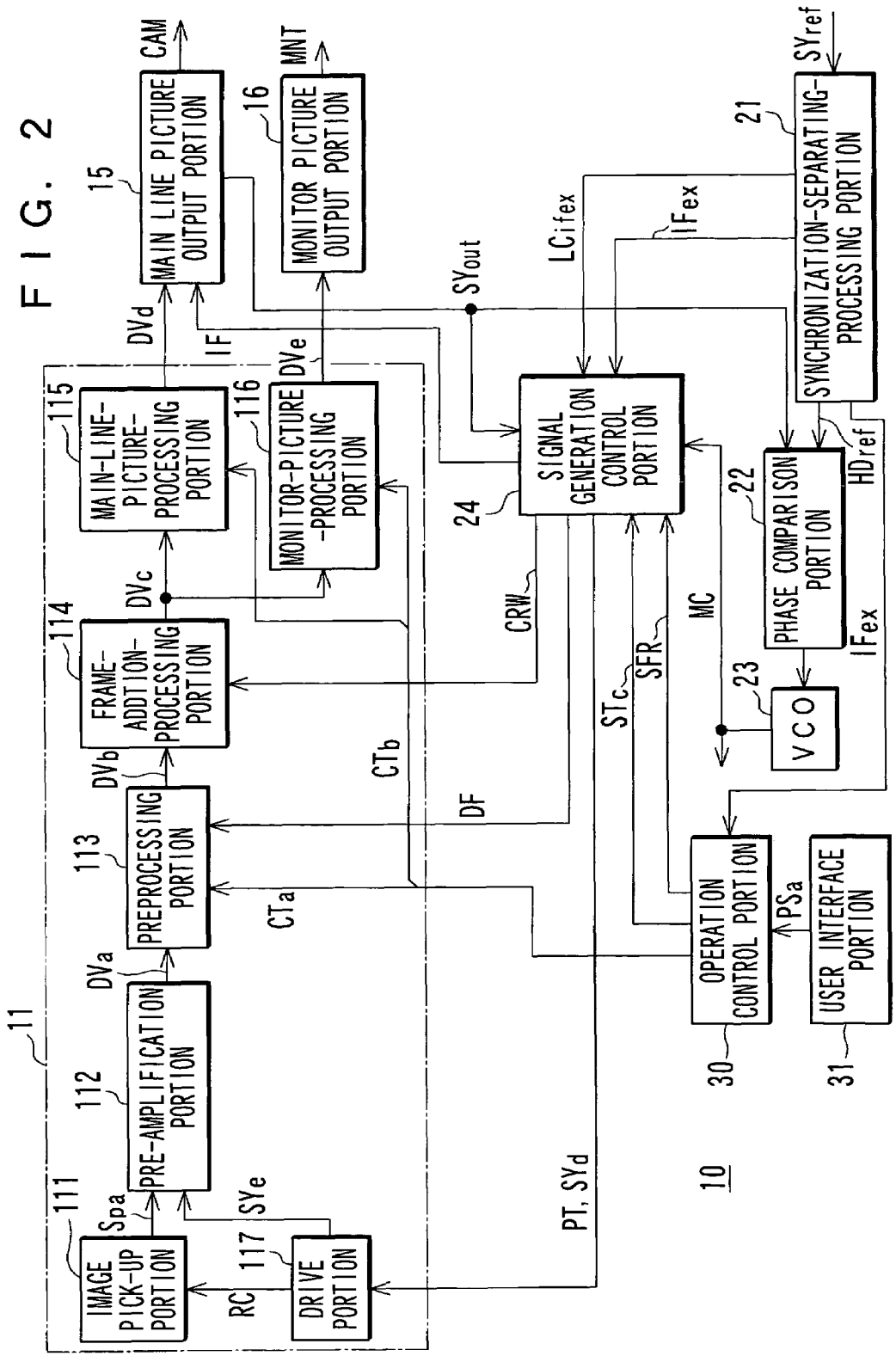
FIG. 2 is a diagram for showing a configuration of an image pick-up device.

FIG. 2 shows a configuration of the image pick-up device 10. On an image pick-up surface of an image pick-up element (not shown) that constitutes an image pick-up portion 111 in an image signal generation portion 11, an image of a subject is formed on the basis of light which is made incident upon the surface through an image pick-up lens (not shown). The image pick-up element generates image pick-up charge for the image of subject through photoelectric transfer and reads the image pick-up charge based on a drive-and-control signal RC out of a later-described drive portion 117 to convert it into a voltage signal. Furthermore, it supplies this voltage signal as an image picked-up signal Spa to a pre-amplification portion 112.

The pre-amplification portion 112 amplifies the picked-up image signal Spa and then performs processing to remove its noise component, for example, correlated dual sampling. Furthermore, it converts the noise-removed image signal into a digital signal to perform feedback clamp processing on it, thereby generating an image signal having a desired magnitude at a stable black level. Furthermore, it performs flare correction to correct a signal level of the image signal in accordance with a flare quantity. Further, the pre-amplification portion 112 performs correction-processing etc. on a defect of the image pick-up element. The processing by this pre-amplification portion 112 is performed on the basis of a synchronization signal SYe supplied from the drive portion 117, to supply a post-processing image signal DVa together with a synchronization signal for this image signal DVa, to a preprocessing portion 113. It is to be noted that, also at the preprocessing portion 113 as well as later-described frame-addition-processing portion 114, main-line-picture-processing portion 115, and monitor-picture-processing portion 116, their processing is performed on the basis of each synchronization signal (not shown) which is supplied together with each image signal, and each post-processing image signal together with each synchronization signal for the image signal are supplied to their following processing portions.

The preprocessing portion 113 uses the image signal DVa to perform signal processing operations, for example, white balance adjustment, gain correction, white shading correction, etc. An image signal DVb obtained by this preprocessing portion 113 is supplied to the frame-addition-processing portion 114. The signal processing operation to be performed at the preprocessing portion 113 is set on the basis of a control signal CTa supplied from an operation control portion 30, which will be described later. Further, when the signal processing operation is changed by using the control signal CTa from the operation control portion 30, using a decision signal DF supplied from a later-described signal generation control portion 24, this change is reflected after a frame addition period ends at the frame-addition-processing portion 114.

The frame-addition-processing portion 114 performs frame addition processing on the image signal DVb to vary a frame rate of the image signal DVb. This frame addition processing can be performed using a random access memory (RAM). For example, to perform 3-frame addition, a first frame of the image signal DVb is stored in an RAM-1, the signal stored in which is read and added to a second frame of the image signal DVb and stored in an RAM-2. The sum signal stored in this RAM-2 is read and added to a third frame of the image signal DVb and stored in an RAM-3. The signal stored in this RAM-3 thus makes a sum of the three frames of the image signal DVb, so that by reading this signal and multiplying its signal level by ($\frac{1}{3}$), a required signal level is obtained. Further, a fourth frame of the image signal DVb is stored in the RAM-1, the signal stored in which is read and added to a fifth frame of the image signal DVb and stored in the RAM-2. The sum signal stored in the RAM-2 is read and added to a sixth frame of the image signal DVb and stored in the RAM-3. The signal stored in this RAM-3 thus makes a sum of the three frames of the image signal DVb, so that by reading this signal and multiplying its signal level by ($\frac{1}{3}$), a required signal level is obtained. Similarly, subsequent three frames of the image signal DVb are added up to sequentially generate an image signal DVc having a required signal level.

It is to be noted that the frame addition processing can be performed also using a frame delay circuit. For example, the first frame of the image signal DVb is delayed by two-frame period through the frame delay circuit and the second frame of the image signal DVb is delayed by one frame period through the frame delay circuit. These delayed first frame of the image signal and second frame of the image signal DVb are added to the third frame of the image signal DVb to obtain a sum of the three frame of the image signal DVb, a signal level of which is multiplied by ($\frac{1}{3}$) as described above to obtain an image signal DVc having a required signal level and an original frame rate multiplied by ($\frac{1}{3}$).

By thus performing the frame addition processing, for example, if a frame rate of the image signal DVb is "60 P" (where the numeral indicates the number of frames per second and P stands for progressive signal, which holds true also with the other cases) and the number of added frames is two, an image signal having a frame rate of "30 P" can be obtained. If the number of added frames is four, an image signal having a frame rate of "15 P" can be obtained.

Furthermore, not only by switching the number of added frames but also by controlling signal reading from the image pick-up element so that the frame rate of the picked-up image signal Spa can vary, the frame rate of the image signal DVc can be varied continuously.

The image signal DVc of a variable frame-rate picked-up image obtained at the frame-addition-processing portion 114 is supplied to the main-line-picture-processing portion 115 and the monitor-picture-processing portion 116.

The main-line-picture-processing portion 115 performs process treatment such as γ correction (gamma correction), profile compensation processing, and Knee correction, on the image signal DVc supplied from the frame-addition-processing portion 114. An image signal DVd obtained by performing the processing at this main-line-picture-processing portion 115 is supplied to a main line picture output portion 15.

The monitor-picture-processing portion 116 performs process treatment in accordance with an image display device connected for confirmation of picked-up images. For example, if an image is displayed using a cathode ray tube or a liquid crystal display element for confirmation of picked-up images, it performs process treatment in accordance with γ characteristics, gray-scale display characteristics, etc. of the cathode ray tube or the liquid crystal display element. An image signal DVe obtained by performing the processing at this monitor-picture-processing portion 116 is supplied to a monitor picture output portion 16. It is to be noted that process treatment operations by the main-line-picture-processing portion 115 and the monitor-picture-processing portion 116 are controlled on the basis of a control signal CTb from the operation control portion 30.

The main line picture output portion 15 converts the supplied image signal DVd into a signal that matches recording equipment etc. connected to this image pick-up device 10 and outputs it as a signal CAM. For example, if equipment that uses a component signal or a composite signal is connected to the pick-up device, it outputs the image signal DVd as a signal CAM that matches respective pieces of equipment. Further, if the image signal is transmitted via a serial digital interface etc. which is standardized as SMPTE259M or SMPTE292M, it generates a transmission signal in accordance with the interface standard on the basis of the image signal DVd and outputs it as the signal CAM. Further, if supplied with image pick-up setting information IF from a signal generation control portion 24, which will be described later, this image pick-up setting information IF is output with it being inserted into the signal CAM. For example, the image pick-up setting information IF is output with it being inserted into a blanking interval of the signal CAM. Furthermore, the main line picture output portion 15 supplies a synchronization signal SYout for the image signal DVd to a phase comparison portion 22 and the signal generation control portion 24.

The monitor picture output portion 16 converts the supplied image signal DVe into a signal MNT that matches an image display device for confirmation of picked-up images and outputs it. For example, if the image display device uses an analog signal, it converts the image signal DVe into an analog signal, which is then output as a signal MNT.

It is to be noted that by changing over a frame rate (hereinafter referred to as "image pick-up frame rate") FRp of the image picked-up signal Spa generated by the image pick-up portion 111 and the number of added frames FA by the frame-addition-processing portion 114, it is possible to continuously vary a frame rate (hereinafter referred to as "variable frame rate") FRc of a variable frame-rate picked-up image. For example, as shown in FIG. 3, to set the variable frame rate FRc into a range of "60 P≧FRc>30 P", the number of added frames FA can be set to "1" and the image pick-up frame rate FRp can be equalized to the variable frame rate FRc. To set the variable frame rate FRc into a range of "30 P≧FRc>20 P", the number of added frames FA can be set to "2" and the image pick-up frame rate FRp can be set to double the variable frame rate FRc. To set the variable frame rate FRc into a range of "20 P≧FRc>15 P", the number of added frames FA can be set to "3" and the image pick-up frame rate FRp can be set to triple the variable frame rate FRc. By similarly changing over the image pick-up frame rate FRp and the number of added frames FA, it is possible to obtain a desired frame rate of the image signal of a variable frame-rate picked-up image.

To vary the frame rate of the image picked-up signal Spa, controlling a charge accumulation period and an image pick-up charge read timing, etc. at the image pick-up element using the drive-and-control signal RC supplied from the drive portion 117 to the image pick-up portion 111 allows the image picked-up signal Spa with the varied frame rate to be obtained. Furthermore, by varying the image pick-up frame rate FRp by adjusting a length of horizontal or vertical blanking interval on the assumption that the common data rate scheme (CDR: common sampling frequency scheme) is used, it is possible to generate such an image picked-up signal Spa that an image size in a valid screen period does not change even if the image pick-up frame rate FRp is varied. Further, by using the CDR scheme, it becomes unnecessary to vary an operating frequency of each of the components that use the image pick-up frame rate FRp in accordance with the image pick-up frame rate FRp, thereby simplifying the configuration thereof.

Figure 4:
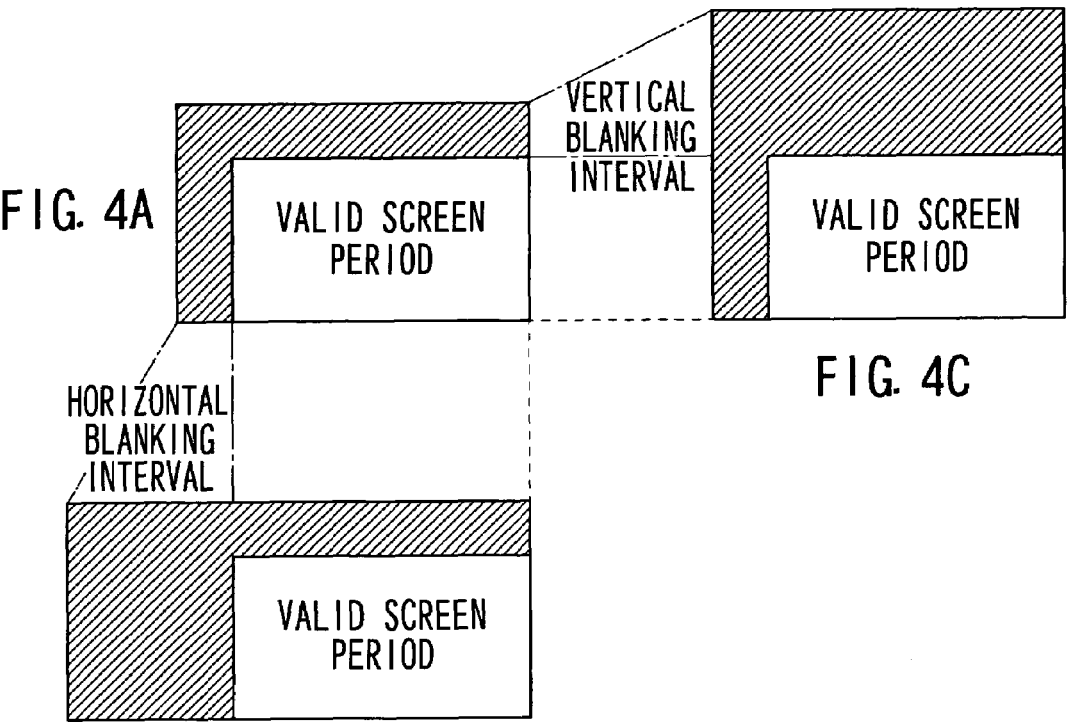
FIG. 4A is a diagram for explaining a CDR scheme.
FIG. 4B is a diagram for explaining the CDR scheme.
FIG. 4C is a diagram for explaining the CDR scheme.

According to the CDR scheme, by adjusting a length of the horizontal blanking interval as shown in FIG. 4B or adjusting a length of the vertical blanking interval as shown in FIG. 4C with respect to such an image signal that the blanking interval and the valid screen periods are set as shown in FIG. 4A, it is possible to generate the image picked-up signal Spa having the varied image pick-up frame rate FRp without changing any image size in the valid screen periods.

A synchronization-separating-processing portion 21 shown in FIG. 2, when supplied with an image signal of a reference variable frame-rate picked-up image having a synchronization signal SYref which corresponds to the reference frame from the synchronization-signal-generating device 50 or a synchronization signal SYref from any other image pick-up devices 10, separates a horizontal synchronization signal HDref from the synchronization signal SYref and supplies it to the phase comparison portion 22. Furthermore, if the supplied signal contains image pick-up setting information IFex, it extracts the image pick-up setting information IFex and supplies the information to the signal generation control portion 24 and the operation control portion 30. Furthermore, it generates an information latch signal LCifex for latching a count value contained in the image pick-up setting information IFex. This image pick-up setting information IFex is used to frame-synchronize an image signal generated by the image pick-up device that is supplied with the image pick-up setting information IFex with an image signal of a reference variable frame-rate picked-up image generated by the image pick-up device which supplies the image pick-up setting information IFex or a reference frame set by the synchronization-signal-generating device 50.

The phase comparison portion 22 determines a difference in phase between a horizontal synchronization signal HDout contained in the synchronization signal SYout supplied from the main line picture output portion 15 and the horizontal synchronization signal HDref supplied from the synchronization-separating-processing portion 21, to control a frequency of an oscillated signal MC generated by a voltage-controlled oscillator (VCO) 23 so that this phase difference may be nil. It is to be noted that if the horizontal synchronization signal HDref is not supplied from the synchronization-separating-processing portion 21, the VCO 23 is permitted to run for itself.

The signal generation control portion 24, which serves as drive-and-control means and setting information generation means, uses the oscillated signal MC generated by the VCO 23, to count based on counter setting information STc supplied from the operation control portion 30. It further utilizes a count result to generate a timing signal PT and a synchronization signal SYd for driving the image pick-up portion 111 and supply them to the drive portion 117. It is to be noted that if the synchronization signal SYref is supplied, it is possible to generate the synchronization signal SYd in such a manner that it may go ahead of the synchronization signal SYref by as much as a difference in phase between the synchronization signals SYout and SYd, thereby synchronizing the synchronization signal SYout with the synchronization signal SYref.

Furthermore, the signal generation control portion 24 generates a pulse signal CRW for controlling, for example, writing of an image signal to and reading of it from the RAM so that the frame-addition-processing portion 114 can add the image signal DVb as much as the number of added frames in order to obtain the image signal DVc. Further, when frame addition processing is performed in the frame-addition-processing portion 114, it generates such a decision signal DF as to indicate a relevant frame addition period and supplies the signal to the preprocessing portion 113.

By thus generating the timing signal PT and the synchronization signal SYd and supplying them to the drive portion 117 and also generating the pulse signal CRW and supplying it to the frame-addition-processing portion 114, the frame rate FRp of the image picked-up signal Spa and the frame addition processing are controlled so that an image signal of the variable frame-rate picked-up image generated by the image signal generation portion 11 may have a frame rate set by the operation control portion 30.

Further, if the image pick-up device is set as a master side one, the signal generation control portion 24 uses an image signal of a variable frame-rate picked-up image generated by this master side image pick-up device as an image signal of a reference variable frame-rate picked-up image to generate the image pick-up setting information IF for causing a slave side image pick-up device to generate an image signal which is frame-synchronized with this image signal and supply this image pick-up setting information IF to the main line picture output portion 15. This image pick-up setting information IF is generated by using a count value obtained through counting and frame rate setting information SFR supplied from the operation control portion 30.

If the image pick-up device is set as a slave side image pick-up device and the image pick-up setting information IFex is supplied from a master side image pick-up device, on the other hand, the timing signal PT, the pulse signal CRW, etc. are generated on the basis of this image pick-up setting information IFex to cause the main line picture output portion 15 to output an image signal which is frame-synchronized with an image signal of a reference variable frame-rate picked-up image generated by the master side image pick-up device.

Figure 5:
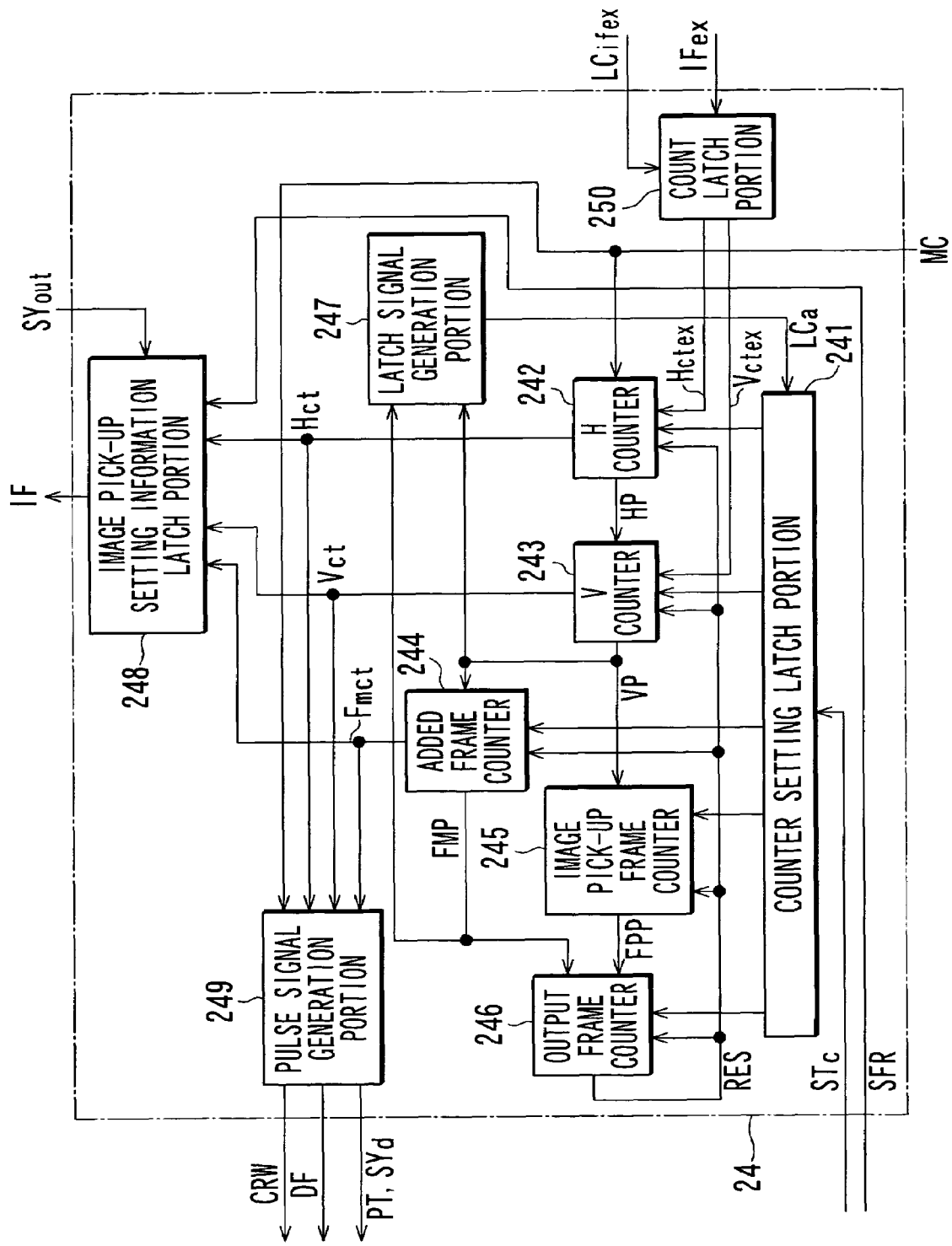
FIG. 5 is a diagram for showing a configuration of a signal generation control portion.
Figure 11:
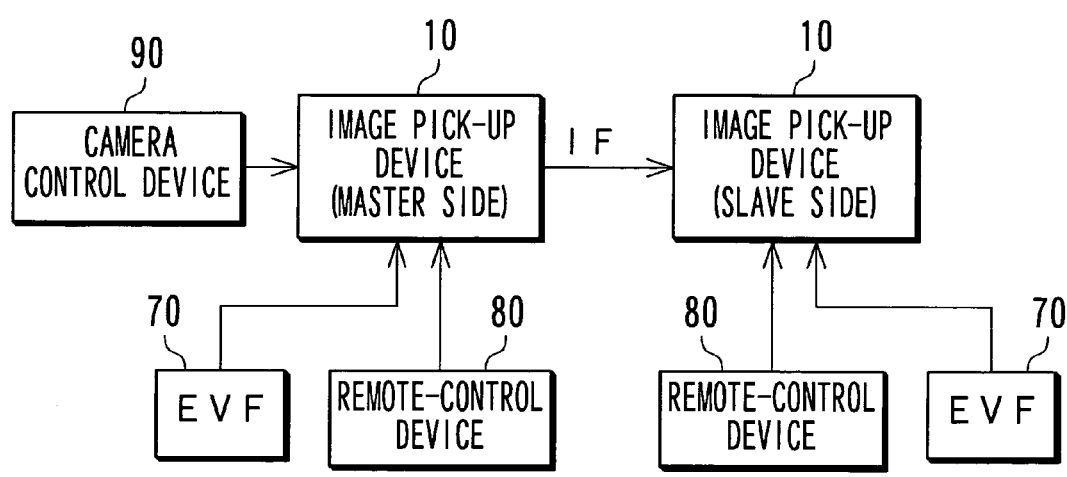
FIG. 11 is a diagram for explaining priority sequence of variable frame rate setting instructions.

FIG. 5 shows a configuration of the signal generation control portion. The counter setting information STc supplied from the operation control portion 30 is supplied to a counter setting latch portion 241. The frame rate setting information SFR supplied from the operation control portion 30, on the other hand, is supplied to an image pick-up setting information latch portion 248.

The counter setting latch portion 241 latches the counter setting information STc based on a setting latch signal LCa supplied from a latch signal generation portion 247, which will be described later. To this counter setting latch portion 241, an H counter 242, a V counter 243, an added frame counter 244, an image pick-up frame counter 245, and an output frame counter 246 are connected. The counter setting information STc is comprised of setting information that sets a count width of each of the counters, to set each counter's count width based on the latched counter setting information STc.

The H counter 242 counts the number of horizontal pixels based on the oscillated signal MC supplied from the VCO23 and supplies a count value Hct to the image pick-up setting information latch portion 248 and a pulse signal generation portion 249. Further, the H counter 242 has its count width set to the number of horizontal pixels for one horizontal scan period based on the counter setting information STc and, upon completion of counting of the horizontal pixels for one horizontal scan period, resets the count value Hct and supplies the V counter 243 with a signal HP indicating that the one horizontal scan period has ended.

The V counter 243 counts the number of scan lines by using the signal HP and supplies a count value Vct to the image pick-up setting information latch portion 248 and the pulse signal generation portion 249. Further, the V counter 243 has its count width set to the number of scan lines for one frame period based on the counter setting information STc and, upon completion of counting of the scan lines for one frame period, resets the count value Vct and supplies a signal VP indicating that the one frame period has ended, to the added frame counter 244, the image pick-up frame counter 245, and the latch signal generation portion 247.

The added frame counter 244 counts the number of image picked-up frames by using the signal VP and supplies a count value Fmct to the image pick-up setting information latch portion 248 and the pulse signal generation portion 249. Further, the added frame counter 244 has its count width set to the number of added frames based on the counter setting information STc and, upon completion of counting of frames for the number of added frames FA, resets the count value Fmct and supplies a signal FMP indicating that the one addition period has ended, to the output frame counter 246 and the latch signal generation portion 247.

The image pick-up frame counter 245 counts image picked-up frames by using the signal VP. The image pick-up frame counter 245 has its count width set to a value of the image pick-up frame rate FRp based on the counter setting information STc and, upon completion of counting of frames for the image pick-up frame rate FRp, resets the count value Fpct and supplies the output frame counter 246 with a signal FPP indicating that a period for the image pick-up frame rate FRp has ended.

The output frame counter 246 counts the number of times the addition period has been encountered by using the signal FMP and, when it has decided on the basis of the signal FPP that a period for the image pick-up frame rate FRp has ended, resets the count values and outputs a count reset signal RES that resets the count values of the other counters.

The latch signal generation portion 247, based on the signals VP and FMP and at timing when frames for one addition period end, generates the setting latch signal LCa that causes the counter setting latch portion 241 to latch the counter setting information STc.

The image pick-up setting information latch portion 248 generates an information latch signal LCif (not shown) and, at latch timing indicated by this information latch signal LCif, latches the count values Hct, Vct, and Fmct and the frame rate setting information SFR and supplies them as the image pick-up setting information IF in a predetermined format to the main line picture output portion 15. For example, the information latch information LCif is generated with ID respect to the synchronization signal SYout, to generate the image pick-up setting information IF and supply it to the main line picture output portion 15 so that the image pick-up setting information IF may be inserted to a predetermined position in the blanking interval. By thus determining the insertion position of the image pick-up setting information IF, the image pick-up setting information IF can be easily extracted from the signal CAM.

The pulse signal generation portion 249 generates the timing signal PT, the synchronization signal SYd, the pulse signal CRW, and the decision signal DF based on the count values Hct, Vct, and Fmct and the oscillated signal MC.

A count latch portion 250, when supplied with the image pick-up setting information IFex from the synchronization-separating-processing portion 21, latches count values Hctex and Vctex contained in the image pick-up setting information IFex and resets a count value of the H counter 242 and that of the V counter 243 to the count values Hctex and Vctex, respectively. This count latch portion 250 latches them at timing of inserting the image pick-up setting information IFex to the position, based on the information latch signal LCifex.

Further, if the timing when the count values Hct and Vct are latched so that the master side image pick-up device may generate the image pick-up setting information IF does not agree with the timing when the slave side image pick-up device resets the H counter 242 and the V counter 243 to the count values Hctex and Vctex, respectively, that is, if these timings do not agree because of a lapse of time required by formatting or decoding of the image pick-up setting information IF, count values Hexct and Vexct are offset by as much as a difference in timing phase and supplied to the H counter 242 and the V counter 243, respectively. Thus, offsetting the count values Hexct and Vexct by as much as the difference in timing phase allows the H counter 242 and the V counter 243 of the slave side image pick-up device to be synchronized with the H counter 242 and the V counter 243 of the master side image pick-up device.

FIGS. 6A-6E each show one example of a count value of each counter in the signal generation control portion. If the variable frame rate FRc is set to "18 P", the number of added frames FA is "3" and the image pick-up frame rate FRp is "54 P" as shown in FIG. 3. Therefore, the count value Fpct repeats itself in a range of "0-53", the count value Fmct repeats itself in a range of "0-2" and a count value Rct repeats itself in a range of "0-17". Further, if the number of pixels per line is 2200 and the number of scan lines is 1125, the count value Vct repeats itself in a range of "0-1124". Furthermore, when the length of a horizontal blanking interval is adjusted in accordance with the CDR scheme, the count value Hct repeats itself in a range of "0-2439", which is larger than the number of pixels, so that the image pick-up frame rate FRp may be "54 P".

The drive portion 117 shown in FIG. 2 generates the drive-and-control signal RC for driving the image pick-up element and supplies it to the image pick-up portion 111 based on the synchronization signal SYd thus supplied. Further, driving the image pick-up element based on the timing signal PT in accordance with the CDR scheme allows the frame rate of the image picked-up signal Spa to vary. Furthermore, the synchronization signal SYe for the image picked-up signal Spa is generated and supplied to the pre-amplification portion 112.

To the operation control portion 30, a user interface portion 31 is connected. When supplied with an operation signal PSa in accordance with a user operation through this user interface portion 31, the operation control portion 30 generates the control signals CTa and CTb based on this operation signal PSa, to control operations of the preprocessing portion 113, the main-line-picture-processing portion 115, and the monitor-picture-processing portion 116. Further, it supplies the counter setting information STc to the signal generation control portion 24 to control counting so that the image signal DVc having a desired frame rate may be generated. Furthermore, it supplies the frame rate setting information SFR to the signal generation control portion 24. Further, when supplied with the image pick-up setting information IFex from the synchronization-separating-processing portion 21, it generates the counter setting information STc based on this image pick-up setting information IFex.

Further, the image pick-up device 10 can insert the image pick-up setting information IFex supplied to itself into a blanking interval of the signal CAM and supply it to the subsequent-stage image pick-up device or supply the synchronization signal SYref supplied to itself to the subsequent-stage image pick-up device, thereby easily generating such an image signal as to have been frame-synchronized among the image pick-up devices even if the plurality of image pick-up devices is connected in a daisy chain.

Next, the following will describe operations for generating an image signal of a variable frame-rate picked-up image in the image pick-up device. FIGS. 7A-7F show a case where the frame-addition-processing portion 114 performs frame addition processing by using RAM-1 through RAM-3, an adder, etc. For example, if the variable frame rate FRc is "18 P", the variable frame rate FRp is "54 P" and the number of added frames FA is "3" from FIG. 3. It is to be noted that FIG. 7A shows a frame of the image signal DVb, FIG. 7B shows an operation of RAM-1 in the frame-addition-processing portion 114, FIG. 7C shows an operation of RAM-2 therein, FIG. 7D shows an operation of RAM-3 therein, and FIG. 7E shows a frame of the image signal DVc.

At time point t1, when frame "0f" of the image signal DVb starts, the frame-addition-processing portion 114 sets, for example, RAM-1 as a write RAM and stores the image signal DVa of frame "0f" in the write RAM.

At time point t2, when a frame of the image signal DVc starts, three frames of the image signal are not completely added up yet, so that the image signal DVc is rendered as a blank frame.

At time point t3, when frame "0f" of the image signal DVb ends and frame "1f" starts, RAM-1 where the image signal of frame "0f" is stored is specified as an internal read RAM and the write RAM is changed over from RAM-1 to, for example, RAM-2. Furthermore, the signal stored in the internal read RAM, that is, the signal of frame "0f" stored in RAM-1 is read and added to the image signal DVa of frame "1f" by the adder and stored in RAM-2, which is the write RAM.

At time point t4, when frame "1f" of the image signal DVb ends and frame "2f" starts, to generate a three-frame addition signal, RAM-2 in which the sum signal of frames "0f" and "1f" is written is specified as the internal read RAM. Further, the write RAM is changed over from RAM-2 to, for example, RAM-3. Furthermore, the signal stored in the internal read RAM, that is, the signal stored in RAM-2 is read and added to the image signal DVb of frame "2f" by the adder and stored in the RAM-3, which is the write RAM.

At time point t5, when frame "2f" of the image signal DVb ends and frame "3f" starts, the three-frame addition signal obtained by adding up three frames of the image signal DVb is generated completely, so that the RAM-3 in which this three-frame addition signal is stored is specified as an external read RAM. Further, RAM-1 is set as the write RAM, to store the image signal DVa of frame "3f" in the write RAM.

When the three-frame addition signal is generated and then a frame of the image signal DVc is timed to start, for example, at time point t6 when the frame of the image signal DVc starts, the three-frame addition signal is read out of the external read RAM and has its signal level multiplied by (⅓) and is output as the image signal DVc. Further, the frame of the image signal DVc generated by reading the three-frame addition signal out of the external read RAM is supposed to be indicated by an identify signal DJ shown in FIG. 7F as a frame of a variable frame-rate picked-up image. It is to be noted that if the three-frame addition signal is not completely written to the RAM yet or if the three-frame addition signal is read completely but the next three-frame addition signal cannot be read, no new frame of the new picked-up image can be generated. In this case, by repeating a frame of a picked-up image having a variable frame rate, a frame (blank frame) having no image signal of the picked-up image is avoided from being provided in the image signal DVc. Further, this frame is made of a repeated frame of the picked-up image with the variable frame rate and so rendered invalid by the identify signal DJ. It is to be noted that a blank frame, if any, is also rendered invalid. By thus generating the identify signal DJ, it is possible to decide a frame of a picked-up image having a variable frame rate by using the identify signal DJ. That is, by selecting an image signal of a frame decided valid by the identify signal DJ, it is possible to select the image signal of a variable frame-rate picked-up image.

Similarly, by using RAM-1 through RAM-3, the adder, etc. to add up three frames of the image signal DVb so that a three-frame addition signal may be generated and reading this three-frame addition signal at timing when a frame of the image signal DVc starts, it is possible to obtain the image signal DVc in which a valid frame is contained at the variable frame rate FRc. That is, as shown in FIG. 7E, it is possible to generate the image signal DVc that contains a frame which is valid at a desired variable frame rate "18 P", which is a recording frame rate (e.g., "60 P") corresponding to the device to which signal CAM is supplied. It is to be noted that if a signal having the signal level of the three-frame addition signal multiplied by (⅓) is stored in a memory and read at a frame rate of 18 P, of course it can be a signal having a frame rate of 18 P.

By reproducing a picked-up image having the thus obtained variable frame rate FRc at a predetermined reproduction frame rate, it is possible to easily obtain fast reproduction images and slow reproduction images. For example, if the reproduction frame rate is "24 P" and when the variable frame rate FRc is set to "24 P" in image pick-up, motion of a subject in a reproduced image has the same speed as the physical subject. If the variable frame rate FRc is set higher than "24 P" in image pick-up, on the other hand, the number of frames generated in a unit time increases, so that the speed of the motion of the subject in the reproduced image decreases. Furthermore, if the variable frame rate FRc is set lower than "24 P" in image pick-up, the number of frames generated in a unit time decreases, so that the speed of the motion of the subject in the reproduced image increases. By thus varying the variable frame rate FRc, it is possible to display the subject moving at speeds different from an actual speed, thereby easily obtaining special video effects.

Next, the following will describe operations for connecting a plurality of image pick-up devices to each other to frame-synchronize image signals generated by these image pick-up devices with each other. Of FIGS. 8A-8N, FIG. 8A-8G each show an operation of the master side image pick-up device and FIGS. 8H-8N each show an operation of the slave side image pick-up device.

FIG. 8A shows setting condition of the variable frame rate FRc in the master side image pick-up device; FIG. 8B shows the count value Vct; FIG. 8C shows the count value Fmct; FIG. 8D shows the count value Fpct; FIG. 8E shows the count value Rct; FIG. 8F shows the setting latch signal Lca; and FIG. 8G shows the information latch signal LCif for latching the image pick-up setting information IF generated by the image pick-up setting information latch portion 248. Further, FIG. 8H shows setting condition of the variable frame rate FRc in the slave side image pick-up device; FIG. 8I shows the information latch signal Lcifex; FIG. 8J shows the count value Vct; FIG. 8K shows the count value Fmct; FIG. 8L shows the count value Fpct; FIG. 8M shows the count value Rct; and FIG. 8N shows the setting latch signal LCa.

At time point t11, when the information latch signal LCif indicates a latch timing, the image pick-up setting information latch portion 248 latches a count value from the counter and the frame rate setting information SFR from the operation control portion 30 and supplies this latched information to the main line picture output portion 15 as the image pick-up setting information IF. The main line picture output portion 15 inserts this image pick-up setting information IF into the signal CAM and outputs it.

FIGS. 9A-9D show the image pick-up setting information IF inserted into the signal CAM. It is to be noted that if the image pick-up setting information IF is large in amount, it is divided into a plurality of lines in a vertical blanking interval and inserted as shown in FIG. 9A. For example, in a first line, the image pick-up frame rate FRp and the count value Vct are inserted as shown in FIG. 9B. In a second line, the count value Fmct and the count value Hct are inserted as shown in FIG. 9C. In a third line, the number of added frames FA is inserted as shown in FIG. 9D. It is to be noted that to each piece of the information, parity PA is added for error detection.

Furthermore, each of the lines is provided with a flag EN indicating whether to validate or invalidate the information. Further, the first line is provided with a scheme decision flag P/I indicating which one of interlace and progressive schemes is employed, an output set flag OR indicating whether the signal CAM is constituted of a signal with a frame rate of 60 P into which an image signal of a picked-up image in accordance with the variable frame rate FRc is contained or of a signal with a frame rate of 30 P into which an image signal of a picked-up image in accordance with the variable frame rate FRc is contained (the output set flag OR may be arranged to indicate whether the frame rate is 48 P or 24 P), pattern operation information TR to which one or a plurality of frame rate alternation patterns is (are) set beforehand so that these set frame rate alteration patterns may be read to vary the frame rate, etc. By providing such the information, it is possible to easily change the frame rate automatically by using a variety of patterns. Alternatively, the count value Fpct may be supplied from the image pick-up frame counter 245 to the image pick-up setting information latch portion 248, to contain the count value Fpct in the image pick-up setting information IF as shown in FIG. 9B. Further, if the image pick-up device capable of switching a horizontal image size is used as a master side image pick-up device and a slave side one, horizontal image size information HW is to be contained in the image pick-up setting information IF as shown in FIG. 9D. In this case, the horizontal image size of the slave side image pick-up device can be matched with that of the master side image pick-up device.

At time point t11 shown in FIGS. 8A-8N, the slave side image pick-up device extracts the inserted image pick-up setting information IF from the signal CAM output from the master side image pick-up device by the synchronization-separating-processing portion 21 and supplied as the image pick-up setting information IFex to the signal generation control portion 24 and the operation control portion 30. Further, based on a synchronization signal for the signal CAM, the information latch signal LCifex for latching a count value contained in the image pick-up setting information IFex is generated by the synchronization-separating-processing portion 21 and supplied to the signal generation control portion 24.

The count latch portion 250 in the signal generation control portion 24 latches the count values Hctex and Vctex contained in the image pick-up setting information IFex, based on the information latch signal LCifex. This latched count value Hctex is supplied to the H counter 242 to reset a count value of the H counter 242 to the count value Hctex. The latched count value Vctex, on the other hand, is supplied to the V counter 243 to reset a count value of the V counter 243 to the count value Vctex. It is to be noted that as described above, if there occurs a difference in phase between timing when the count values Hct and Vct are latched to generate the image pick-up setting information IF at the master side image pick-up device and timing when the H counter 242 and the V counter 243 are reset to the count values Hctex and Vctex, respectively, at the slave side image pick-up device, the count values Hctex and Vctex are offset by as much as this difference in phase. By thus offsetting the count values Hctex and Vctex, it is possible to synchronize the H counter 242 and the V counter 243 of the master side image pick-up device and the slave side image pick-up device. That is, it is possible to match frame timing between the master side image pick-up device and the slave side image pick-up device. It is to be noted that if the count value Fpct is contained in the image pick-up setting information IF, image pick-up frame counter 245 also can be synchronized, so that it is possible to match the number of picked-up image frames in the master side image pick-up device and that in the slave side image pick-up device with each other.

Next, at time point t12, when the variable frame rate is set to "18 P", as described above, the image pick-up frame rate FRp is "54 P" and the number of added frames FA is "3". Therefore, the operation control portion 30 sets the count width of the added frame counter 244 to "3", the count width of the image pick-up frame counter 245 to "54", the count width of the output frame counter 246 to "18", and the image pick-up frame rate FRp to "54 P" by adjusting the length of the horizontal blanking interval in accordance with the CDR scheme, so that it generates the counter setting information STc that sets the count width of the H counter 242 to "2440" and supplies the information to the counter setting latch portion 241. It is to be noted that if the number of scan lines for each frame interval is fixed, the count width of the H counter 242 is fixed to a value that corresponds to the number of scan lines. Further, to vary the image pick-up frame rate FRp by switching the number of scan lines or adjusting the length of the vertical blanking interval, the counter setting information STc that sets the count width of the V counter 243 in accordance with the number of scan lines and the image pick-up frame rate is generated and supplied to the counter setting latch portion 241. Further, the frame rate setting information SFR that has the image pick-up frame rate FRp and the number of added frames FA when the variable frame rate FRc is set to "18 P" is supplied to the image pick-up setting information latch portion 248.

It is to be noted that since the count widths of the added frame counter 244, the image pick-up frame counter 245, and the output frame counter 246 are based on the variable frame rate FRc, the image pick-up frame rate FRp, and the number of added frames FA as described above, they can be determined easily when the variable frame rate FRc is set. Further, since the count width of the H counter 242 is determined in accordance with the image pick-up frame rate FRp which is set by adjusting the number of per-line pixels and the length of the horizontal blanking interval through the CDR scheme, it is possible to easily generate the counter setting information STc by holding a table having a count width of the H counter 242 with respect to the variable frame rate FRc or the image pick-up frame rate FRp beforehand as shown in FIG. 10 so that it may be read as required.

At time point t13, when the information latch signal LCif indicates a latch timing, similarly at time point t11, the image pick-up setting information IF is inserted into the signal CAM and output. This image pick-up setting information IF is used to notify the slave side image pick-up device that the variable frame rate FRc has been set to "18 P".

At time point t13, further, similarly at time point t11, the slave side image pick-up device uses the synchronization-separating-processing portion 21 to extract the image pick-up setting information IFex from the signal CAM output from the master side image pick-up device and supplies it to the signal generation control portion 24 and the operation control portion 30. Further, it generates the information latch signal LCifex based on the synchronization signal for the signal CAM and supplies the signal to the signal generation control portion 24 so that the H counter 242 and the V counter 243 in the signal generation control portion 24 may be synchronized with the H counter 242 and the V counter 243 in the master side image pick-up device, respectively.

Furthermore, the operation control portion 30 in the slave side image pick-up device, similar to the mater side image pick-up device, generates the counter setting information STc based on the image pick-up frame rate FRp and the number of added frames FA contained in the supplied image pick-up setting information IFex and supplies it to the counter setting latch portion 241.

Then, at time point t14, when a frame addition period ends in the master side image pick-up device and the setting latch signal LCa is supplied from the latch signal generation portion 247 in the signal generation control portion 24 to the counter setting latch portion 241 therein, the counter setting information STc supplied from the operation control portion 30 is latched. This latched counter setting information STc is supplied to the H counter 242, the added frame counter 244, the image pick-up frame counter 245, and the output frame counter 246, so that the count width of each of the counters is set in accordance with the variable frame rate FRc. Therefore, the count value Hvt of the H counter 242 repeats itself in a range of "0-2439", the count value Fmct of the added frame counter 244 repeats itself in a range of "0-2", the count value Fpct of the image pick-up frame counter 245 repeats itself in a range of "0-53", and the count value Rct of the output frame counter 246 repeats itself in a range of "0-17", thus starting an operation to generate the image signal with the variable frame rate FRc as set to "18 P". It is to be noted that the count value Hvt of the V counter 243 refers to a count value of the scan lines per frame.

Similarly, in the slave side image pick-up device also, at time point t14, when a frame addition period ends and the setting latch signal LCa is supplied from the latch signal generation portion 247 in the signal generation control portion 24 to the counter setting latch portion 241 therein, the counter setting information STc supplied from the operation control portion 30 is latched. This latched counter setting information STc is supplied to the H counter 242, the added frame counter 244, the image pick-up frame counter 245, and the output frame counter 246, so that the count width of each of the counters is set in accordance with the variable frame rate FRc. Therefore, as in the case of the master side image pick-up device, the count value Hvt of the H counter 242 repeats itself in a range of "0-2439", the count value Fmct of the added frame counter 244 repeats itself in a range of "0-2", the count value Fpct of the image pick-up frame counter 245 repeats itself in a range of "0-53", and the count value Rct of the output frame counter 246 repeats itself in a range of "0-17", thus starting an operation to generate the image signal with the variable frame rate FRc as set to "18 P". It is to be noted that the count value Hvt of the V counter 243 is the same as that for the master side image pick-up device.

Next, at time point t15, when the variable frame rate FRc is changed to "13 P", this changed variable frame rate FRc is posted from the master side image pick-up device to the slave side image pick-up device at time point t16. Further, at time point t17, when the frame addition period ends, the count width of each of the counters is changed, so that an operation at this changed variable frame rate FRc is started by both of the master side image pick-up device and the slave side image pick-up device simultaneously.

The image pick-up setting information IF is thus supplied from the master side image pick-up device to the slave side image pick-up device, so that operations of the slave side image pick-up device are set on the basis of this image pick-up setting information IF. Therefore, an image signal of a variable frame-rate picked-up image generated by the slave side image pick-up device is frame-synchronized with an image signal of a reference variable frame-rate picked-up image generated by the master side image pick-up device. Furthermore, even if the variable frame rate varies, frame-synchronized condition is maintained because this variation is synchronously performed in the master side and slave side image pick-up devices.

Further, if the scheme decision flag P/I indicating which one of interlace and progressive schemes is employed is contained in the image pick-up setting information IF, these schemes can be accommodated easily by holding information such as the image pick-up frame rate FRp, the number of added frames FA, and the count width of the H counter for the variable frame rate in condition with the information corresponding to each of the schemes.

If the pattern operation information TR is contained therein, on the other hand, the master side and slave side image pick-up devices can automatically vary the variable frame rate as synchronized therebetween, thereby improving operability of the image pick-up devices. In this case, the same frame rate alteration pattern is held in the master side and slave side image pick-up devices beforehand. For example, one or a plurality of piece(s) of frame rate alteration pattern information each for indicating the variable frame rate FRc which is set as image pick-up time elapses is generated and held in the operation control portion 30 or a memory (not shown) in each of the master side and slave side image pick-up devices. It is to be noted that by transferring frame rate alteration pattern information to be used from the image pick-up device that holds this information to the image pick-up device that does not have it before image pick-up starts, it is possible to hold the same frame rate alteration pattern information in a plurality of image pick-up devices that are connected.

If a held frame rate alteration pattern is read and a frame rate is instructed in accordance with this read frame rate alteration pattern to vary a frame rate of a variable frame-rate picked-up image, the master side image pick-up device outputs information that indicates the read frame rate alteration pattern as the pattern operation information TR with it being contained in the image pick-up setting information IF. Furthermore, pieces of counter setting information STc in accordance with variable frame rates indicated by the frame rate alteration pattern are sequentially generated and supplied to the counter setting latch portion 241. The slave side image pick-up device, if pattern operation information TR is contained in the image pick-up setting information IF, reads a frame alteration pattern that corresponds to the pattern operation information TR, sequentially generates counter setting information pieces STc in accordance with variable frame rates indicated by this read frame rate alteration pattern, and supplies them to the counter setting latch portion 241. In this case, a frame rate indicated by the frame alteration pattern is set as a frame rate of a variable frame-rate picked-up image to drive the image signal generation portion 11 starting from such a frame of the variable frame-rate picked-up image as to be given first after the image pick-up setting information IF is output from the master side image pick-up device or starting from such a frame of the variable frame-rate picked-up image as to be given first after the image pick-up setting information IF is input into the slave side image pick-up device. Therefore, the variable frame rate FRc is changed as synchronized between the master side and slave side image pick-up devices, so that these devices can generate such image signals that a frame rate of a variable frame-rate picked-up image is automatically changed in condition where their frames are synchronized with each other.

It is to be noted that instruction to set a variable frame rate FRc in the master side and slave side image pick-up devices is not limited to a case where it is performed on the basis of the above-described image pick-up setting information IF but can be performed also by a menu operation signal from an electronic viewfinder (EVF) 70, a remote-control signal from a remote-control device 80, a control signal from a camera control device 90, etc.

Therefore, the operation control portion 30 sets priority sequence to instructions to set the variable frame rate FRc so that the variable frame rate FRc may be set in accordance with the priority sequence. For example, it gives priority to the remote control-signal from the remote-control device 80 over the menu operation signal from the electronic viewfinder 70. Further, the image pick-up setting information IF is given priority over the remote-control signal. Furthermore, the control signal from the camera control device 90 is given priority over the image pick-up setting information IF. By thus allocating the priorities, the image pick-up devices can be operated properly even if the plurality of instructions to set the variable frame rate FRc is given simultaneously.

Further, it may be arranged that if a setting instruction having higher priority has ended, a variable frame rate FRc at the time of the ending is held or the variable frame rate FRc is returned to condition before the setting instruction having the higher priority is performed. For example, if the image pick-up setting information IF is supplied when the variable frame rate FRc is being set by the menu operation signal from the electronic viewfinder 70, such a variable frame rate FRc as to be indicated by the image pick-up setting information IF is set. Then, when the supply of the image pick-up setting information IF ends, a variable frame rate FRc at the time of the ending of the supply is held. Alternatively, it may be recovered to a variable frame rate FRc, which has been set by the menu operation signal. In such a manner, a variety of operations can be performed by controlling the variable frame rate FRc.

Further, although the above embodiment has been described with reference to a case where an image signal of a variable frame-rate picked-up image generated by the slave side image pick-up device is frame-synchronized with an image signal of a variable frame-rate picked-up image generated by the master side image pick-up device, the image signals generated by the image pick-up devices 10 can be frame-synchronized with each other by the synchronization-signal-generating device 50 as shown in FIG. 1B. In this case, the synchronization-signal-generating device 50 inserts the image pick-up setting information IF into a reference synchronization signal SYref and supplies it to these image pick-up devices 10.

Figure 12:
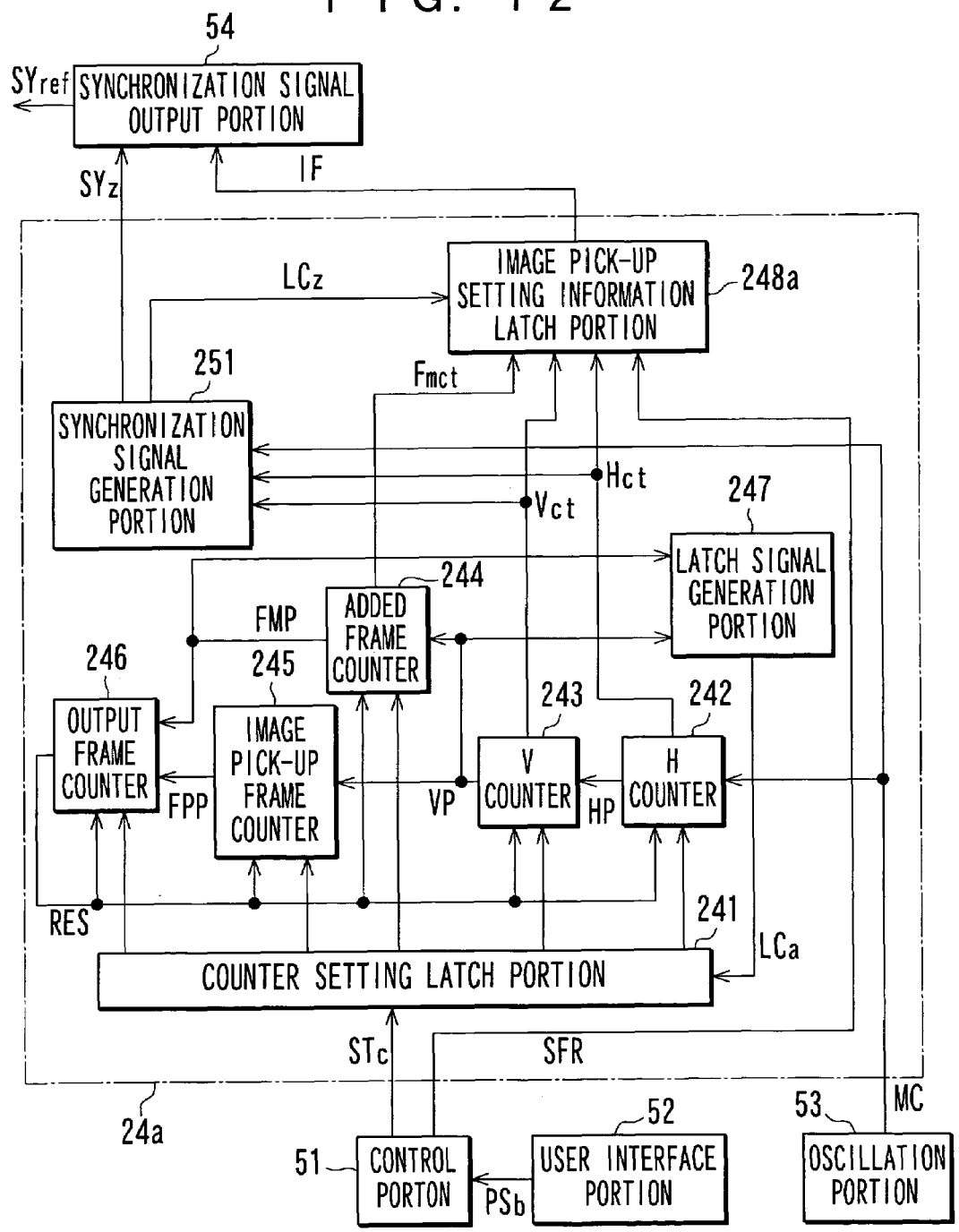
FIG. 12 is a diagram for showing a configuration of a synchronization-signal-generating device.

FIG. 12 shows a configuration of the synchronization-signal-generating device. It is to be noted that components of FIG. 12 that correspond to those of FIG. 5 are indicated by the same reference symbols and detailed description of them will be omitted. To a control portion 51 a user interface portion 52 is connected, so that the control portion 51 generates the counter setting information STc and the frame rate setting information SFR in accordance with a variable frame rate FRc indicated by an operation signal PSb from a user interface. It further supplies the generated counter setting information STc to the counter setting latch portion 241 in a signal generation control portion 24a, which serves as setting information generation means and synchronization signal generation means. Further, it supplies the frame rate setting information SFR to the image pick-up setting information latch portion 248.

An oscillation portion 53 generates the oscillated signal MC and supplies it to the H counter 242 and the synchronization signal generation portion 251. The synchronization signal generation portion 251 generates a synchronization signal SYz based on a count value of each counter and the oscillated signal MC to set a reference frame, which provides a reference for each of the image pick-up devices 10. This generated synchronization signal SYz is supplied to a synchronization signal output portion 54. Further, the synchronization signal generation portion 251 generates an information latch signal LCz whose latch timing is an insertion position of the image pick-up setting information IF which is set with respect to the synchronization signal SYz and supplies it to an image pick-up setting information latch portion 248a.

The image pick-up setting information latch portion 248a latches the count values Hct, Vct, and Fmct and the frame rate setting information SFR at latch timing indicated by the information latch signal LCz and supplies them to the synchronization signal output portion 54 as the image pick-up setting information IF in a predetermined format.

The synchronization signal output portion 54 inserts the image pick-up setting information IF into the synchronization signal SYz supplied from the synchronization signal generation portion 251 and supplies the synchronization signal SYref that corresponds to the reference frame to each of the image pick-up devices.

By thus supplying, from the synchronization-signal-generating device 50, each of the image pick-up devices with the synchronization signal SYref into which the image pick-up setting information IF is inserted, the same operation as the above-described slave side image pick-up devices is performed at each of the image pick-up devices, so that an image signal of a variable frame-rate picked-up image which is frame-synchronized with the reference frame can be output from each of the image pick-up devices.

In such a manner, image signals of variable frame-rate picked-up images can be generated by the plurality of image pick-up devices in condition where they are frame-synchronized with each other, so that by picking up images of a subject in different directions using a plurality of image pick-up devices, it is possible to easily obtain such a plurality of reproduced fast images or slow images that the subject's motions are synchronized with each other and the images are picked up in the different directions. Further, these image signals are frame-synchronized with each other, thereby facilitating editing processing.

According to the present invention, the device comprises image signal generation means for generating an image signal of a variable frame-rate picked-up image, drive-and-control means for driving and controlling the image signal generation means, setting information generation means for generating image pick-up setting information to generate an image signal which is frame-synchronized with the image signal generated by the image signal generation means, and output means for outputting the image signal generated by the image signal generation means and the image pick-up setting information. Therefore, controlling the generation of the image signal based on the output image pick-up setting information allows the image signal to be generated with this image signal being frame-synchronized with the image signal into which the image pick-up setting information is inserted.

Further, frame rate information is contained in the image pick-up setting information, so that starting from such a frame of a variable frame-rate picked-up image as to be given first after this image pick-up setting information is output, a frame rate indicated by the frame rate information contained in this output image pick-up setting information is set as a frame rate of the variable frame-rate picked-up image, to drive the image signal generation means. Therefore, it is possible to vary the frame rate of a variable frame-rate picked-up image in synchronization with the image pick-up device that is supplied with the image pick-up setting information.

Further, containing, in image pick-up setting information, information of a scan line position and a pixel position of an image signal to be generated allows the scan line position and the pixel position of the image signal generated by the image pick-up device that is supplied with the image pick-up setting information, to be synchronized. Further, if holding means for holding a frame rate alteration pattern is provided and when the frame rate alteration pattern held in the holding means is read and a frame rate that corresponds to this read frame rate alteration pattern is instructed, to vary a frame rate of a variable frame-rate picked-up image, information indicating the read frame rate alteration pattern is contained in the image pick-up setting information and, starting from such a frame of a variable frame-rate picked-up image as to be given first after this image pick-up setting information is output, the instructed frame rate is set as the frame rate of the variable frame-rate picked-up image, to generate an image signal. It is thus possible to change frame rates of image signals generated by the image pick-up devices supplied with the image pick-up setting information in condition where they are synchronized with each other. Furthermore, the plurality of frame rate instruction means for instructing a frame rate of a variable frame-rate picked-up image and the operation control means for setting priority sequence to the plurality of frame rate instruction means to set a frame rate instructed by the frame rate instruction means that has the highest priority as a frame rate of a variable frame-rate picked-up image are provided so that image pick-up setting information may be generated which is used to generate an image signal that is frame-synchronized with an image signal having the set frame rate of the variable frame-rate picked-up image, thereby properly setting a frame rate of a variable frame-rate picked-up image and generating image pick-up setting information in accordance with priority sequence even if the plurality of frame rate instructions is issued.

Furthermore, the image signal generation means for generating an image signal of a variable frame-rate picked-up image and the drive-and-control means for receiving image pick-up setting information to generate an image signal that is frame-synchronized with an image signal of a reference variable frame-rate picked-up image, for controlling driving of the image signal generation means based on this image pick-up setting information so that the image signal generated by the image signal generation means may be frame-synchronized with the image signal of the reference variable frame-rate picked-up image are provided. It is thus possible to generate an image signal that is frame-synchronized with an image signal of the reference variable frame-rate picked-up image.

Further, if frame rate information indicating a frame rate of a reference variable frame-rate picked-up image is contained in image pick-up setting information, starting from such a frame of a variable frame-rate picked-up image as to be given first after this image pick-up setting information is input, a frame rate indicated by the frame rate information contained in this input image pick-up setting information is set as a frame rate of the variable frame-rate picked-up image, to generate an image signal. It is thus possible to vary a frame rate of a variable frame-rate picked-up image in synchronization with the image pick-up device that has supplied the image pick-up setting information.

Further, if the image pick-up setting information contains information of a scan line position and a pixel position, a generated image signal is synchronized with these scan line position and pixel position. Therefore, it is possible to synchronize the image signal generated by the image pick-up device that has supplied the image pick-up setting information, with the scan line position and the pixel position. Furthermore, if the holding means for holding frame rate alteration patterns is provided and the image pick-up setting information contains information which is used to read the frame rate alteration patterns, a frame rate alteration pattern indicated by this information is read and a frame rate is instructed in accordance with the read frame rate alteration pattern, so that starting from such a frame of a variable frame-rate picked-up image as to be given first after the image pick-up setting information is input, the instructed frame rate is set as a frame rate of a variable frame-rate picked-up image, to generate an image signal. Therefore, it is possible to alter the frame rate in synchronization with the image signal generated by the image pick-up device that has supplied the image pick-up setting information. Further, the frame rate instruction means for instructing a frame rate of a variable frame-rate picked-up image and the operation control means for setting priority sequence to the frame rate instructed by the frame rate instruction means and a frame rate based on the image pick-up setting information so that the frame rate having higher priority may be set as a frame rate of a variable frame-rate picked-up image are provided, to generate an image signal by using the frame rate of the variable frame-rate picked-up image as the set frame rate. Therefore, it is possible to properly set a frame rate of a variable frame-rate picked-up image based on the priority sequence even if a plurality of frame rate instructions is issued.

Further, the synchronization signal generation device comprises the setting information generation means for generating image pick-up setting information which is used to frame-synchronize an image signal generated by the image signal generation means of the image pick-up device with a reference frame, the synchronization signal generation means for generating a synchronization signal that corresponds to this reference frame, the synchronization signal output means for outputting the generated synchronization signal with the generated image pick-up setting information being inserted into it, and the control means for setting the reference frame, so that it is possible to frame-synchronize the image signals generated by the image pick-up devices connected to the synchronization signal generating device.

INDUSTRIAL APPLICABILITY

As described above, the present invention enables to be generated the image signals of a variable frame rate picked-up image which are frame-synchronized with each other by using a plurality of image pick-up devices, so that images of a subject are picked up in different directions by varying a frame rate, and could well be applied to a case of obtaining special video effects such as fast reproduction and slow reproduction.

The invention claimed is:

1. An image pick-up device comprising:
image signal generation means for generating an image signal of a variable frame-rate picked-up image;
drive-and-control means for driving and controlling the image signal generation means;
setting information generation means for generating image pick-up setting information to generate an image signal which is frame-synchronized with the image signal generated by the image signal generation means, wherein the setting information generation means makes information of a scan line position and a pixel position of an image signal included in the image pick-up setting, said information being generated by the image signal generation means information; and
output means for outputting the image signal generated by the image signal generation means and the image pick-up setting information.

2. An image pick-up device comprising:
image signal generation means for generating an image signal of a variable frame-rate picked-up image;
drive-and-control means for driving and controlling the image signal generation means;
setting information generation means for generating image pick-up setting information to generate an image signal which is frame-synchronized with the image signal generated by the image signal generation means;
output means for outputting the image signal generated by the image signal generation means and the image pick-up setting information; and
holding means for holding a frame rate alteration pattern,
wherein when reading the frame rate alteration pattern held in the holding means and instructing a frame rate in accordance with this read frame rate alteration pattern to vary a frame rate of the variable frame-rate picked-up image, the setting information generation means makes information indicating the read frame rate alteration pattern included in the image pick-up setting information; and
wherein the drive-and-control means drives and controls the image signal generation means, starting from a frame of the variable frame-rate pricked-up image that is given first after the image pick-up setting information is output, by setting the instructed frame rate as a frame rate of the variable frame-rate picked-up image.

3. An image pick-up device comprising:
image signal generation means for generating an image signal of a variable frame-rate picked-up image;
drive-and-control means for driving and controlling the image signal generation means;
setting information generation means for generating image pick-up setting information to generate an image signal which is frame-synchronized with the image signal generated by the image signal generation means;
output means for outputting the image signal generated by the image signal generation means and the image pick-up setting information;
a plurality of frame rate instruction means each for instructing a frame rate of the variable frame-rate picked-up image; and
operation control means for setting priority sequence to the plurality of frame rate instruction means, to set a frame rate instructed by the frame rate instruction means that has the highest priority as a frame rate of the variable frame-rate picked-up image,
wherein the setting information generation means generates image pick-up setting information which is used to generate an image signal that is frame-synchronized with an image signal having the set frame rate of the variable frame-rate picked-up image.

4. An image pick-up device comprising:
image signal generation means for generating an image signal of a variable frame-rate picked-up image; and
drive-and-control means for receiving image pick-up setting information to generate an image signal that is frame-synchronized with the image signal of a reference variable frame-rate picked-up image, and controlling a driving operation of the image signal generation means based on this image pick-up setting information, thereby frame-synchronizing the image signal generated by the image signal generation means with the image signal of the reference variable frame-rate picked-up image,
wherein, if the image pick-up setting information contains frame rate information indicating a frame rate of the reference variable frame-rate picked-up image, the drive-and- control means drives the image signal generation means, starting from a frame of the variable frame-rate picked-up image that is given first after this image pick-up setting information is input, by setting a frame rate indicated by the frame rate information contained in the input image pick-up setting information as a frame rate of the variable frame-rate picked-up image.

5. An image pick-up device comprising:
image signal generation means for generating an image signal of a variable frame-rate picked-up image; and
drive-and-control means for receiving image pick-up setting information to generate an image signal that is frame-synchronized with the image signal of a reference variable frame-rate picked-up image, and controlling a driving operation of the image signal generation means based on this image pick-up setting information, thereby frame-synchronizing the image signal generated by the image signal generation means with the image signal of the reference variable frame-rate picked-up image,
wherein, if the image pick-up setting information contains information of a scan line position and a pixel position, the drive-and-control means synchronizes an image signal generated by the image signal generation means with the scan line position and the pixel position.

6. An image pick-up device comprising:
image signal generation means for generating an image signal of a variable frame-rate picked-up image;
drive-and-control means for receiving image pick-up setting information to generate an image signal that is frame-synchronized with the image signal of a reference variable frame-rate picked-up image, and controlling a driving operation of the image signal generation means based on this image pick-up setting information, thereby frame-synchronizing the image signal generated by the image signal generation means with the image signal of the reference variable frame-rate picked-up image; and
holding means for holding a frame rate alteration pattern,
wherein, if the image pick-up setting information includes information which is used to read the frame rate alteration pattern, the holding means reads the frame rate alteration pattern indicated by this information and instructs a frame rate in accordance with this read frame rate alteration pattern; and
wherein the drive-and-control means drives the image signal generation means, starting from a frame of the variable frame-rate picked-up image that is given first after the image pick-up setting information is input, by setting the frame rate instructed by the holding means as a frame rate of the variable frame-rate picked-up image.

7. An image pick-up device comprising:
image signal generation means for generating an image signal of a variable frame-rate picked-up image;
drive-and-control means for receiving image pick-up setting information to generate an image signal that is frame-synchronized with the image signal of a reference variable frame-rate picked-up image, and controlling a driving operation of the image signal generation means based on this image pick-up setting information, thereby frame-synchronizing the image signal generated by the image signal generation means with the image signal of the reference variable frame-rate picked-up image;
frame rate instruction means for instructing a frame rate of the variable frame-rate picked-up image; and
operation control means for setting priority sequence to the frame rate instructed by the frame rate instruction means and the frame rate based on the image pick-up setting information, to set the frame rate that has higher priority as the frame rate of the variable frame-rate picked-up image,
wherein the drive-and-control means drives the image signal generation means by using the frame rate of the variable frame-rate picked-up image as the frame rate that is set by the operation control means.

8. The image pick-up device according to claim 7,
wherein, if input of the image pick-up setting information is stopped when higher priority is set to a frame rate based on the image pick-up setting information than a frame rate instructed by the frame rate instruction means, the operation control means sets a frame rate set before the input of the image pick-up setting information as the frame rate of the variable frame-rate picked-up image.

9. The image pick-up device according to claim 7, wherein, if input of the image pick-up setting information is stopped when higher priority is set to a frame rate based on the image pick-up setting information than a frame rate instructed by the frame rate instruction means, the operation control means sets a frame rate at the time when the input of the image pick-up setting information is stopped, as the frame rate of the variable frame-rate picked-up image.

* * * * *